United States Patent
van den Bergh et al.

(10) Patent No.: US 7,453,180 B2
(45) Date of Patent: Nov. 18, 2008

(54) ROTARY DISK ENERGY STORAGE AND PULSE POWER SUPPLY

(75) Inventors: Hugo H. van den Bergh, San Diego, CA (US); Robert Kratz, San Diego, CA (US)

(73) Assignee: General Atomics, San Diego, CA (US)

( * ) Notice: Subject to any disclaimer, the term of this patent is extended or adjusted under 35 U.S.C. 154(b) by 98 days.

(21) Appl. No.: 10/994,903

(22) Filed: Nov. 22, 2004

(65) Prior Publication Data

US 2005/0236918 A1    Oct. 27, 2005

Related U.S. Application Data

(60) Provisional application No. 60/524,767, filed on Nov. 25, 2003.

(51) Int. Cl.
    *H02K 21/12*    (2006.01)
(52) U.S. Cl. .................. 310/156.37; 310/266; 310/114
(58) Field of Classification Search ......... 310/112–114, 310/266, 268, 68 R, 156.32, 156.36, 156.37
    See application file for complete search history.

(56) References Cited

U.S. PATENT DOCUMENTS

| | | | | |
|---|---|---|---|---|
| 3,320,454 A | * | 5/1967 | Kober | ...................... 310/268 |
| 4,578,606 A | * | 3/1986 | Welterlin | .................. 310/68 R |
| 5,786,645 A | * | 7/1998 | Obidniak | .................. 310/68 R |
| 5,831,365 A | * | 11/1998 | Keim et al. | ............ 310/156.29 |
| 5,952,755 A | * | 9/1999 | Lubas | .................... 310/156.19 |
| 6,181,048 B1 | * | 1/2001 | Smith et al. | ................. 310/261 |
| 6,373,160 B1 | * | 4/2002 | Schrodl | ...................... 310/114 |
| 6,841,910 B2 | * | 1/2005 | Gery | .......................... 310/103 |
| 6,849,984 B2 | * | 2/2005 | Gallant | ....................... 310/178 |
| 2001/0004174 A1 | * | 6/2001 | Gallant | ........................ 310/74 |

* cited by examiner

*Primary Examiner*—Dang D Le
(74) *Attorney, Agent, or Firm*—Nydegger & Associates

(57) ABSTRACT

A system for generating an electrical current in a circuit includes a rotor, a stator and a motor for rotating the rotor about a rotation axis. A plurality of permanent magnets are mounted on the rotor and radially distanced from the rotation axis. With this structure, the permanent magnets rotate with the rotor to establish a time-varying magnetic field. A winding is attached to the stator, connected to the circuit and immersed in the time-varying magnetic field generated by the permanent magnets. In one implementation, a switch is provided to reconfigure the circuit between a first, open-circuit configuration in which little or no current flows through the circuit, and a second closed-circuit configuration in which a current is generated at the winding for flow through the circuit.

16 Claims, 2 Drawing Sheets

ROTARY DISK ENERGY STORAGE AND PULSE POWER SUPPLY

This application claims the benefit of U.S. Provisional Application Ser. No. 60/524,767 filed Nov. 25, 2003.

FIELD OF THE INVENTION

The present invention pertains generally to systems and methods for generating electrical power. More particularly, the present invention pertains to systems and methods for generating and storing a relatively large amount of kinetic energy and then rapidly converting the stored kinetic energy into electrical energy. The present invention is particularly, but not exclusively, useful as a system for generating a relatively large pulse of electrical current from the energy stored inertially in the mass of a spinning rotor.

BACKGROUND OF THE INVENTION

Electrical currents having high amperage and in the form of one or more pulses of relatively short duration are useful for many applications. Typical applications include, but are not limited to, use as a power supply for a rail gun, to launch payloads into space, or to accelerate components to very high velocities (e.g. Mach 10) for structural testing. Heretofore, a typical power supply system for producing high amperage pulses has included a rotor/stator system having electromagnets that are mounted on the rotor, and electric windings that are mounted on the stator. For these systems, an external motor is generally used to turn the rotor about a rotation axis. During most of this rotation, the electric windings are switched into an open circuit state so that no current flows through the electric winding. When a current pulse is required, however, the electromagnets on the rotor are energized. Thereafter, the electric winding is quickly connected to a load (e.g. rail gun) to close a circuit that includes both the winding and the load. For some applications, the rotor must be held at a relatively high rotational velocity for a long period of time until a current pulse is needed.

In greater detail, generation of an electrical current occurs due to the interaction between the electric windings on the stator and a time-varying magnetic field that is generated by the rotating electromagnets. Typically, when the electric winding is connected to the load, a high amperage current pulse of relatively short duration is passed through the load. This pulse power extraction drastically reduces the rotational speed of the rotor, which results in a falling exit voltage.

A common design that has been previously utilized for high amperage pulse production has included a geometry that was borrowed from state of the art electric alternators and motor designs. In this geometry, a drum-shaped rotor having a relatively long axial length and relatively short diameter is used. Also, for this design, the electromagnets are positioned at or near the circumference of the rotor and the stator is formed with a surface that is shaped and positioned to surround the cylindrical surface of the drum. With this structure, the magnetic field generated by the electromagnets radially crosses a circumferential gap between the rotor and the stator to intersect the stator windings.

At this point, for the structure described above, it is worthwhile to note that both the magnitude of the generated current as well as the length of the pulse duration will depend on many factors including the size of the field generated by the electromagnets, and the diameter, weight and rotational speed of the rotor. Indeed, heretofore, to generate a high amperage current, relatively heavy, high-speed rotors have been used that are generally supported by at least two heavily loaded, high-speed bearings. These high-speed bearings typically require constant cooling which can be expensive and often require significant maintenance.

Another disadvantage presented by the above-described structure arises due to the fact that a relatively large current must be used to energize the electromagnets that rotate with the rotor. Specifically, these currents typically generate substantial amounts of ohmic heat that must be dissipated and removed from the rotor. Additionally, in order to supply this direct current to the rotating electromagnets, slip rings and brushes have generally been required. Unfortunately, these slip rings and brushes are required to work continuously and at high speeds, even when the electromagnets are not energized. As a consequence, the brushes and slip rings tend to wear quickly and require frequent replacement.

Another drawback associated with the structure described above concerns the positioning of the electromagnets at the circumference of the rotor. With this positioning, the electromagnets are exposed to large centrifugal forces during the high speed rotation of the rotor. Indeed, in some cases, these centrifugal forces can be so strong as to require the use of retaining bands to hold the electromagnets in place. Unfortunately, these retaining bands often intrude into the gap between the electromagnets and the current windings, requiring the use of a gap that is wider than the optimum theoretical gap width. The result of this non-optimal gap width is that the induced voltage in the current windings is significantly less than what it could otherwise be with an optimal gap width. (i.e. without retaining bands).

Another factor that must be considered when contemplating the design of a device having a large rotating mass is the substantial reaction moments that are created when the rotor rapidly decelerates. These reaction moments are transferred to the platform that the device is mounted on. For the case where the platform is a vehicle (e.g. tank, small ship, etc) these reaction moments can be disruptive. To obviate this concern, two identical, counter-rotating devices can be mounted on a single platform to allow the rotating masses to be simultaneously decelerated to produce offsetting reaction moments. Lastly, for vehicle-mounted systems having heavy rotors which rotate about a horizontal rotation axis, these rotors act as gyroscopes and can disrupt vehicle steering. This can be overcome by designing a device in which the rotor(s) rotate about a substantially vertical axis.

In light of the above, it is the object of the present invention to provide an energy storage and pulse power supply system that does not require rotating windings and, thus, does not require a sub-system to dissipate and remove ohmic heat from a rotating machine part, or the use of high-speed, high-current slip rings and brushes. It is another object of this invention to provide an energy storage and pulse power supply system having an optimal gap width between the magnets and the current windings. Yet another object of the present invention is to provide systems and methods for generating, storing and converting stored kinetic energy into electrical energy which are easy to use, relatively simple to implement, and comparatively cost effective.

SUMMARY OF THE INVENTION

The present invention is directed toward a system for generating an electrical current in a circuit and includes a rotor, together with a motor for rotating the rotor about a rotation axis. For the present invention, a plurality of permanent magnets are mounted on the rotor and radially distanced from the rotation axis. With this structure, the permanent magnets rotate with the rotor to establish a time-varying magnetic field. For the system of the present invention, a generator winding is connected to the circuit. Also, the winding is immersed in the time-varying magnetic field that is generated by the rotating permanent magnets. A switch is provided to reconfigure the circuit during rotation of the rotor between a first, open-circuit configuration in which little or no current flows through the circuit, and a second closed-circuit configuration in which a current is generated in the winding for flow through the circuit.

In one embodiment of the system, the rotor is disk-shaped and can be characterized as having a radius to axial length ratio that is greater than one (r/l>1). Specifically, the rotor typically includes two disk-shaped portions that are aligned parallel to each other. The disk-shaped portions are spaced apart along the axis and establish two opposed, substantially flat, circular surfaces that face each other and are each formed with a respective circular groove. These grooves are centered on the rotation axis and a plurality of permanent magnets are disposed in each of the grooves. In some cases, these permanent magnets are arranged as a Halbach array, with each magnet in the array being positioned in the circular groove. For this embodiment, a stator is mounted on a base and positioned between the two opposed rotor surfaces. In addition, the generator winding(s) are mounted on the stator and positioned relative to the permanent magnets to immerse each winding in the time-varying magnetic field that is generated during a rotation of the magnets.

Structurally, when the rotor and magnets are stationary, the windings are juxtaposed with the magnets to establish a gap therebetween. Specifically, the gap has a width that extends substantially parallel to the rotation axis. With this gap, an electrically conductive shield can be interposed between the magnets and winding. In greater detail, this shield is attached to the rotor, and it rotates with the rotor. This arrangement then allows the time-varying magnetic field that is generated by the rotating magnets to pass through the shield and reach the windings. On the other hand, because the shield moves relative to the generator winding, it blocks magnetic fields that are created by the generator windings from reaching the permanent magnets. Specifically, the shield blocks the relatively large fields created during a pulse that could otherwise demagnetize the permanent magnets.

In a particular embodiment of the system, the motor that is used to turn the rotor about the rotation axis is a synchronous motor (SM). For this embodiment, the synchronous motor includes a plurality of permanent magnets (in addition to the magnets provided for the generator). The SM magnets are held in circular grooves on the opposed surfaces of the rotor. Specifically, the grooves for the SM are centered on the rotation axis at a greater radial distance than the grooves used for the generator magnets. Like the generator magnets, for the synchronous motor, a Halbach array of permanent magnets is typically used, with each magnet in the array being positioned in the SM circular groove. In addition, the synchronous motor also includes one or more SM power windings that are mounted on the stator for interaction with the SM permanent magnets. Structurally, the SM magnets are spaced from the SM power windings and define a gap that extends in a direction that is substantially parallel to the rotation axis. A current source is connected to the SM power windings to selectively activate the synchronous motor.

In another aspect of the present invention, an embodiment of the system can be constructed having a levitation assembly to levitate the rotor during rotation. Once levitated, the rotor is free to rotate without a bearing, eliminating the need for an expensive, heavy duty, actively cooled bearing. In greater detail, the levitation assembly includes one or more permanent magnets (in addition to the magnets used for the SM and generator). The levitation magnet(s) are mounted on the base and a conductive ring is mounted on the rotor and positioned at the rotor's periphery. In a typical setup, the disk-shaped rotor is oriented to rotate about a substantially vertical rotation axis. With this orientation, the conductive ring interacts with the base-mounted levitation magnets during rotation of the rotor to levitate the rotor above the base. On the other hand, when the rotor is at rest and at relatively slow rotation speeds, the rotor is typically supported by bearing pads.

In yet another aspect of the present invention, a system can be constructed that includes a plurality of stator-rotor subsystems. In one implementation, the subsystems are stacked along and centered on a common rotational axis and configured to allow each rotor to spin independently of the other rotors. Typically, each subsystem includes two rotor/stator pairs and is arranged such that the two rotors in the subsystem rotate in opposite directions.

In operation, the system is initially configured in an open switch state wherein the generator winding is disconnected from the load (e.g. rail gun). Next, the synchronous motor is activated to rotate the rotor(s) to a desired rotational velocity wherein a pre-selected kinetic energy is stored in the rotating rotor(s). This rotates the permanent magnets on the rotor relative to the generator windings on the stator. Next, when a pulse of current is required, the switch is closed to connect the generator winding and the load. This passes an electrical pulse through the load and slows the rotational velocity of the rotor. The switch is then opened and the rotor is accelerated by the synchronous motor back to the desired rotational velocity. At this point, the system is ready to deliver another current pulse to the load.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
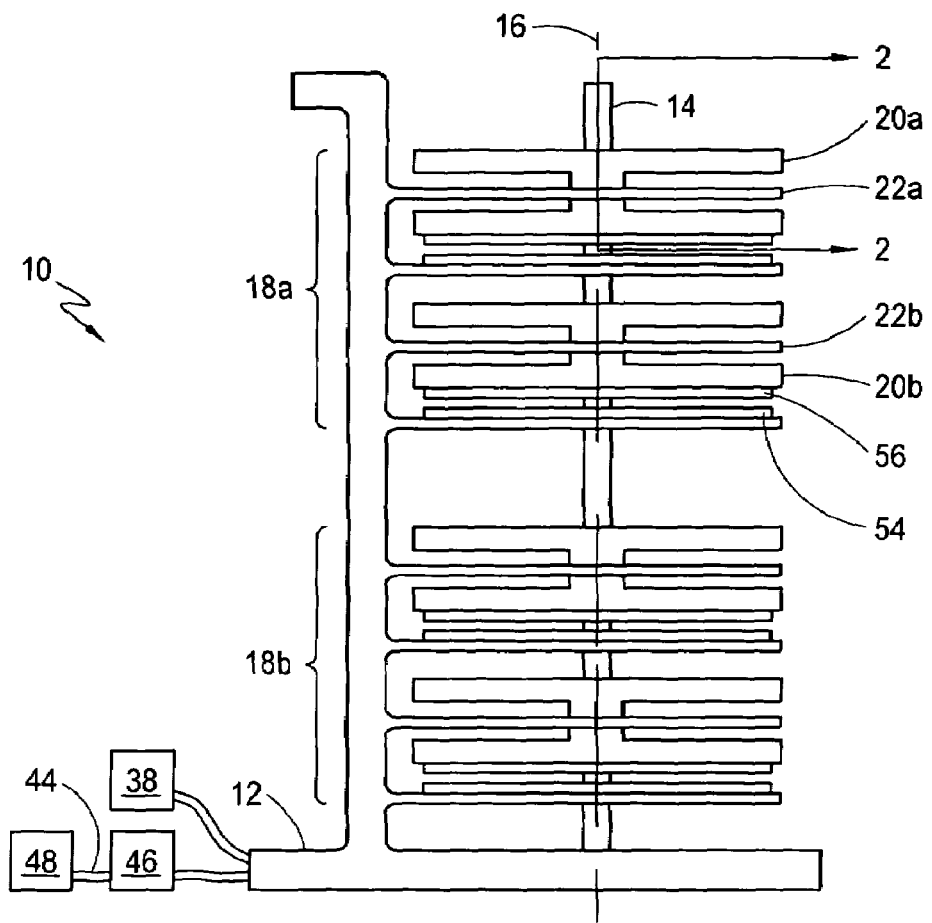
FIG. 1 is a simplified, elevational view of a system for generating an electrical current in a circuit, shown with peripheral components depicted schematically.

Referring initially to FIG. 1, a system for generating an electrical current is shown and generally designated 10. As shown, the system 10 includes a base 12 and a shaft 14 that is fixedly mounted on the base 12 and aligned along a vertical axis 16. It can further be seen that the system 10 includes two subsystems 18a,b. For the system 10, each subsystem 18a,b is independently operable and capable of producing an electrical current on demand. In a typical embodiment, each subsystem 18a,b is configured to produce a current pulse having a relatively large power. As further shown in FIG. 1, each subsystem 18a,b includes a pair of disk-shaped rotors 20a,b that are each centered on the axis 16 and independently rotatable about the shaft 14 and axis 16. Each subsystem 18a,b also includes a pair of disk-shaped stators 22a,b that are each centered on the axis 16, rigidly attached to the base 12, and positioned for interaction with a respective rotor 20a,b, as shown. Typically, in the operation of the system 10, the rotors 20a,b within each subsystem 18a,b rotate in opposite directions.

Figure 2:
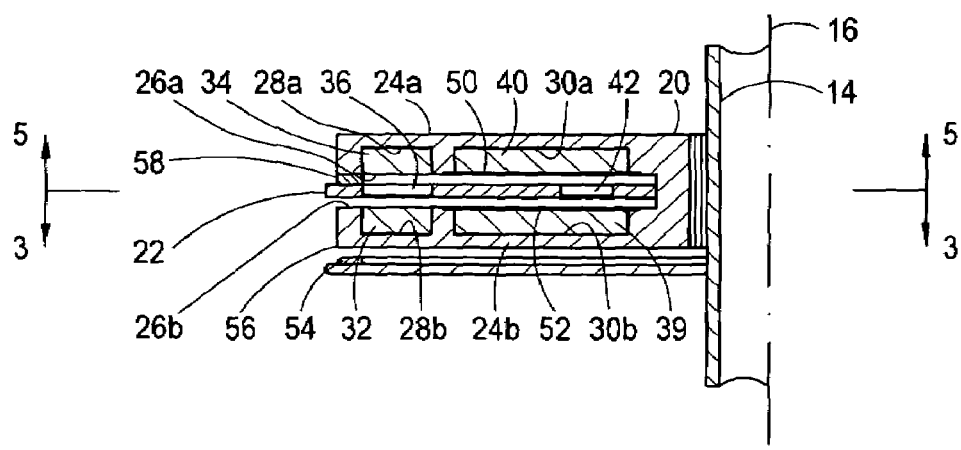
FIG. 2 is a cross sectional view showing half of a rotor/stator assembly as seen along line 2-2 in FIG. 1.

As best seen in FIG. 2, each rotor 20 is formed with two disk-shaped portions 24a,b that extend radially from a central hub portion and are axially spaced apart to create a gap therebetween. In addition, each rotor portion 24a,b is formed with a respective surface 26a,b that faces the gap. These surfaces 26a,b are each formed, respectively, with a first circular groove 28a,b and a second circular groove 30a,b. FIG. 2 further shows that the stator 22 is disposed in the gap between the surfaces 26a,b and is spaced from each surface 26a,b.

For the system 10, each rotor 20/stator 22 set includes a synchronous motor to rotate the rotor 20 around the vertical axis 16. More specifically, as best seen with reference to FIG. 2, the synchronous motor includes a first plurality of permanent magnets 32 that are disposed in the groove 28b and a second plurality of permanent magnets 34 that are disposed in the groove 28a. These magnets 32, 34 are mounted on the rotor 20 for rotation therewith. In addition, the synchronous motor includes a polyphase winding 36 that is mounted on the stator 22 and positioned between the magnets 32 and the magnets 34, as shown. FIG. 1 shows, schematically, that a current source 38 is provided to selectively pass an electrical current through the polyphase winding 36 (shown in FIG. 2) to activate the synchronous motor.

Figure 3:
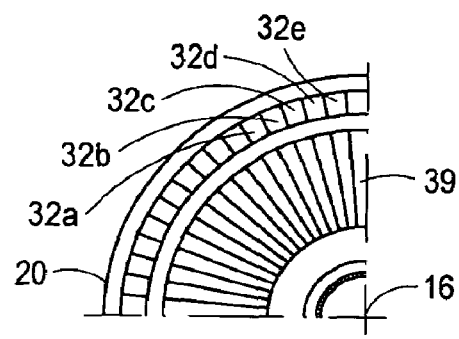
FIG. 3 is a view of a portion of a rotor inner surface as seen in the direction of arrow 3-3 in FIG. 2.
Figure 4:
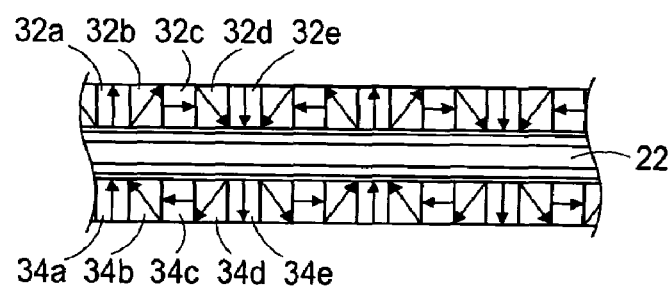
FIG. 4 is a schematic view depicting a double Halbach magnet array.

A better understanding of the arrangement of magnets 32, 34 can be obtained with cross-reference to FIGS. 3 and 4. As shown there, magnets 32a-e are arranged in a circular pattern that extends around the axis 16. As best seen in FIG. 4, the magnets 32a-e, 34a-e are arranged in a double Halbach array configuration. Specifically, FIG. 4 shows the magnetic polarization (indicated by arrows) of each magnet in the double Halbach array. Those skilled in the pertinent art will appreciate that this arrangement increases the magnitude of the magnetic fields that are produced on one side of the array (i.e. the side facing the stator 22), while for all practical purposes, eliminating all magnetic fields on the opposite side. Stated another way, the double Halbach array as shown in FIG. 4 concentrates the magnetic fields in the gap between the two parallel arrays.

Figure 5:
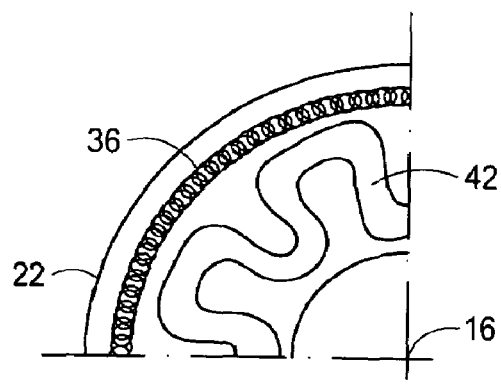
FIG. 5 is a view of a portion of a stator face as seen in the direction of arrow 4-4 in FIG. 2.

Although FIGS. 2, 3 and 5 show the synchronous motor components located near the outer radius of the rotor 20/stator 22, it is to be appreciated that it could also be mounted elsewhere on the rotor 20/stator 22, and a single, rather than double, Halbach array could be used with loss of motor efficiency. For the system 10, the synchronous motor is used to accelerate the rotor 20 until its rotational speed corresponds to the desired inertial energy that is to be stored. Once the desired speed is reached, the synchronous motor needs to supply only sufficient power to offset any small friction losses that may occur during steady-state operation, and the current in the synchronous motor windings 36 can be drastically reduced.

FIG. 2 further shows that each rotor 20/stator 22 set includes an electrical current generator assembly. More specifically, as best seen with cross reference to FIGS. 2 and 3, the current generator assembly includes a first plurality of permanent magnets 39 that are disposed in the groove 30a and a second plurality of permanent magnets 40 that are disposed in the groove 30b. These magnets 39, 40 are mounted on the rotor 20 for rotation therewith. In addition, the current generator assembly includes a generator winding 42 that is mounted on the stator 22 and positioned between the magnets 39 and the magnets 40, as shown in FIG. 2. Functionally, the permanent magnets 39, 40 and the generator winding 42 combine to constitute a generator that can be used to extract power from the rotor 20 after the rotor 20 has been placed in rotary motion by the synchronous motor described above.

For the system 10, the permanent magnets 39, 40 are arranged in a circular pattern that extends around the axis 16 (see FIG. 3). In addition, like the magnets 32a-e, 34a-e described above, the magnets 39, 40 for the current generator assembly are typically arranged in a double Halbach array as illustrated for magnets 32a-e, 34a-e in FIG. 4. As described above, the double Halbach arrangement concentrates the magnetic fields in the gap between the two parallel arrays. As best seen in FIG. 5, the generator winding 42 typically consists of one cloverleaf turn of a flat, wide ribbon of transposed conductive wires. Specifically, the winding 42 consists of only one cloverleaf turn per rotor 20 to limit its self-inductance. It is to be appreciated that the use of transposed conductive wires allows the magnetic field to fully penetrate the flat ribbon, and prevents eddy current losses. Although a flat ribbon, cloverleaf winding 42 is shown, it is to be appreciated by the skilled artisan that other types of windings with other types of cable could be used, for example, if power is not required to be extracted in short pulses with high efficiency.

Operationally, movement of the Halbach arrays (i.e. permanent magnets 39, 40) relative to the stationary generator windings 42 on the stator 22 generates an alternating voltage in the generator windings 42. FIG. 1 shows that the windings 42 (see also FIG. 2) are typically connected in a circuit 44 that includes a switch 46 and a load 48. For the system 10, the load 48 can be, for example, a rail gun that requires a high energy short pulse of current for operation. Generally, switch 46 is configured in an open state and the synchronous motor is activated to counter rotate both rotors 20a,b of a subsystem 18. When an electrical pulse is required by the load 48, the switch 46 is closed, producing an alternating current in the circuit 44 from both rotor 20/stator 22 sets in the subsystem 18.

In most applications, a relatively large current is produced in the generator windings 42. This current has the potential to generate a magnetic field which tends to demagnetize the permanent magnets 39, 40. For this reason, the system 10 typically includes a pair of substantially flat, circular, electrically conductive shields 50, 52 that are attached to and rotate with the rotor 20 as shown in FIG. 2. More specifically, as shown, shield 50 is positioned between the winding 42 and the permanent magnets 40, and shield 52 is positioned between the winding 42 and the permanent magnets 39. With this cooperation of structure, the shields 50, 52 prevent demagnetization of the permanent magnets 39, 40 and reduce the self-inductance of the generator windings 42.

Referring back to FIG. 1, for the system 10 shown, each rotor 20/stator 22 set also includes a rotor levitation unit. Specifically, as shown, the rotor levitation unit includes several electromagnets 54 that are attached to the base 12 and positioned opposite a conductive ring 56 that is mounted on the rotor 20 (see also FIG. 2). Functionally the electromagnets 54 and the conductive ring 56 constitute a rotor levitation unit that raises the rotor 20 above the base 12 during rotation of the rotor 20. FIG. 2 also shows that a bearing pad 58 is attached to the stator 22. When the rotor 20 is at rest or slowly moving, the bearing pad 58 supports the rotor 20. When the rotor 20 is moving, the rotor levitation unit (which includes the electromagnets 54 and the conductive ring 56), generates levitation, and in addition, generates drag forces that tend to impede the rotation of the rotor 20. This drag on the rotating rotor 20 increases from zero with increasing speed until a peak value is reached at a relatively low rotational speed. After the peak value is reached, the drag steadily decreases to an insignificant value at the operational rotating speed of the rotor 20. In a typical operation, the levitation unit is not activated (i.e. the electromagnets 54 are switched off) until after the rotor 20 is rotating at a speed greater than the peak drag speed. This avoids having to increase the synchronous motor winding currents for the additional load caused by the peak drag. Thus, during low speed rotation, the rotor 20 is supported by the bearing pad 58. After the rotor velocity has surpassed the velocity corresponding to the peak drag, the electromagnets 54 are switched on and the rotor 20 levitates.

In another embodiment (not shown), the electromagnets 54 of the levitation unit can be replaced with permanent magnet Halbach arrays. For this case, the synchronous motor may be required to deliver the additional power required for a short period of time to overcome the peak drag on the rotor 20. For the embodiment described above, wherein each rotor 20 is individually powered with its own synchronous motor, the common, stationary shaft 14, around which all rotors 20 rotate, does not typically experience any significant torsion loads.

While the particular Rotary Disk Energy Storage and Pulse Power Supply and corresponding methods of use as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A system for generating an electrical current in a circuit which comprises:
    a base;
    a rotor mounted on the base for rotation about an axis;
    a stator rigidly attached to the base;
    a first plurality of permanent magnets mounted in an annular groove on the rotor at a first radial distance from the axis;
    a polyphase winding mounted on the stator;
    a current source connected to the polyphase winding for interaction of the polyphase winding with the first plurality of magnets to rotate the rotor;
    a second plurality of permanent magnets mounted in an annular groove on the rotor at a second radial distance from the axis to establish a time-varying magnetic field during rotation of the rotor, and to establish a radial gap between the first plurality of permanent magnets and the second plurality of permanent magnets;
    a generator winding mounted on the stator for generating an electrical current in response to the time-varying magnetic field;
    a switch for reconfiguring the circuit between a first, open-circuit configuration and a second closed-circuit configuration wherein the current generated at the generator winding flows through the circuit; and
    a conductive shield mounted on said rotor for rotation therewith, said conductive shield being positioned between said second plurality of permanent magnets and the generator winding on said stator to prevent de-magnetization of said second plurality of permanent magnets when said switch is closed, wherein said conductive shield terminates adjacent the radial gap between the first plurality of permanent magnets and the second plurality of permanent magnets.

2. A system as recited in claim 1 wherein said second plurality of permanent magnets is arranged as a Halbach array.

3. A system as recited in claim 1 wherein said first plurality of permanent magnets is arranged as a Halbach array.

4. A system as recited in claim 1 wherein said axis is aligned substantially vertically and said system further comprises a means for levitating said rotor above said base during a rotation of said rotor.

5. A system as recited in claim 4 wherein said levitating means comprises:
    a conductive ring mounted on said rotor for rotation therewith; and
    at least one electro-magnet mounted on said base.

6. A system as recited in claim 1 wherein said rotor is substantially disk-shaped.

7. A system as recited in claim 1 wherein said generator winding includes a plurality of transposed conductive wires.

8. A system as recited in claim 1 wherein the first radial distance is greater than the second radial distance.

9. A system as recited in claim 1 wherein the rotor is a first rotor with the stator axially distanced from the first rotor and wherein the system further comprises:
    a second rotor axially distanced from the stator, opposite the first rotor, and mounted on the base for rotation about the axis;
    a first plurality of permanent magnets mounted in an annular groove on the second rotor at the first radial distance from the axis for interaction with the polyphase winding to rotate the second rotor; and
    a second plurality of permanent magnets mounted in an annular groove on the second rotor at the second radial distance from the axis to contribute to the time-varying magnetic field during rotation of the second rotor.

10. A system for powering an electrical load, said system comprising:
    a base;
    a pair of rotors positioned on the base for rotation about an axis, with each rotor having a first plurality of permanent magnets mounted thereon at a first radial distance from the axis, and a second plurality of permanent magnets mounted thereon at a second radial distance from the axis to establish a radial gap between the first plurality of permanent magnets and the second plurality of permanent magnets;
    a stator mounted on the base to extend between the rotors;
    an electrical means mounted on the stator for interacting with the first pluralities of permanent magnets to rotate the pair of rotors and their respective second plurality of permanent magnets to generate a time-varying magnetic field;
    a winding mounted on the stator to generate a current in response to a rotation of the second pluralities of permanent magnets;
    a means for connecting the winding to the electrical load to provide current from the winding for the electrical load; and
    a conductive shield mounted on each rotor for rotation therewith, said conductive shield being positioned between said second plurality of permanent magnets and the winding on said stator to prevent de-magnetization of said second plurality of permanent magnets when said switch is closed, wherein said conductive shield terminates adjacent the radial gap between the first plurality of permanent magnets and the second plurality of permanent magnets.

11. A system as recited in claim 10 wherein said interacting electronic means comprises:
   a polyphase winding mounted on said stator and juxtaposed with said first plurality of permanent magnets; and
   a current source connected to said polyphase winding.

12. A system as recited in claim 11 wherein said first plurality of permanent magnets is arranged as a Halbach array and said second plurality of permanent magnets is arranged as a Halbach array.

13. A system as recited in claim 10 wherein said axis is aligned substantially vertical and said system further comprises:
   a base; and
   a means for levitating said rotor above said base during rotation of said rotor.

14. A method for powering an electrical load, said method comprising the steps of:
   mounting a pair of rotors for rotation on a base, with each rotor having a first plurality of permanent magnets mounted thereon and a second plurality of permanent magnets mounted thereon to establish a radial a between the first plurality of permanent magnets and the second plurality of permanent magnets, with a stator fixedly mounted on the base and extending between the rotors, wherein the stator includes a polyphase winding for interacting with the first pluralities of permanent magnets, and a winding for interacting with the second pluralities of permanent magnets;
   energizing the polyphase winding to generate a time-varying magnetic field with the second plurality of permanent magnets and a consequent current in the winding in response to rotation of the second plurality of permanent magnets;
   selectively connecting the winding to the electrical load to provide current from the winding for the electrical load; and
   providing a conductive shield mounted on each rotor for rotation therewith, each conductive shield being positioned between respective said second plurality of permanent magnets and the respective winding on said stator to prevent de-magnetization of said second plurality of permanent magnets when said switch is closed during a connection of the winding with the electrical load, wherein each conductive shield terminates adjacent the radial gap between the respective first plurality of permanent magnets and the respective second plurality of permanent magnets.

15. A method as recited in claim 14 wherein said first and said second plurality of permanent magnets are each arranged as a Halbach array.

16. A method as recited in claim 14 wherein said axis is aligned substantially vertical and said method further comprises the step of levitating said rotor above said base during rotation of said rotor.

* * * * *

UNITED STATES PATENT AND TRADEMARK OFFICE
CERTIFICATE OF CORRECTION

| | | |
|---|---|---|
| PATENT NO. | : 7,453,180 B2 | Page 1 of 1 |
| APPLICATION NO. | : 10/994903 | |
| DATED | : November 18, 2008 | |
| INVENTOR(S) | : Van Den Bergh et al. | |

It is certified that error appears in the above-identified patent and that said Letters Patent is hereby corrected as shown below:

Column 9, Line 25
DELETE
"radial a between"
INSERT
-- radial gap between --

Signed and Sealed this

Twenty-seventh Day of January, 2009

JOHN DOLL
*Acting Director of the United States Patent and Trademark Office*